(12) United States Patent
Xiao et al.

(10) Patent No.: US 12,154,262 B2
(45) Date of Patent: Nov. 26, 2024

(54) IMAGE DEFECT DETECTION METHOD FOR LOCATING A DEFECT OF A TO-BE DETECTED IMAGE, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Huihui Xiao, Beijing (CN); Lei Nie, Beijing (CN); Jianfa Zou, Beijing (CN); Feng Huang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 668 days.

(21) Appl. No.: 17/444,883

(22) Filed: Aug. 11, 2021

(65) Prior Publication Data
US 2022/0036533 A1    Feb. 3, 2022

(30) Foreign Application Priority Data
Dec. 25, 2020    (CN) .......................... 202011563435.9

(51) Int. Cl.
*G06T 7/00*    (2017.01)
*G06F 18/22*    (2023.01)
(Continued)

(52) U.S. Cl.
CPC ............. *G06T 7/001* (2013.01); *G06F 18/22* (2023.01); *G06N 20/00* (2019.01); *G06T 5/00* (2013.01);
(Continued)

(58) Field of Classification Search
CPC .. G06T 7/001; G06T 5/00; G06T 5/50; G06T 2207/20221; G06T 2207/20084;
(Continued)

(56) References Cited

U.S. PATENT DOCUMENTS 6,578,188 B1    6/2003    Pang et al.
11,423,526 B2*  8/2022    Chen ...................... G01B 11/24
(Continued)

FOREIGN PATENT DOCUMENTS

CN    111127412 A    5/2020
CN    111768381 A    10/2020
(Continued)

OTHER PUBLICATIONS

Tang, S. et al. "Progressive mask-oriented unsupervised fabric defect detection under background repair" Coloration Technology—College of Communication and Information Engineering, Xian Univ. of Science and Technology, Feb. 24, 2023, pp. 1-18 (Year: 2023).*

(Continued)

*Primary Examiner* — Mia M Thomas
(74) *Attorney, Agent, or Firm* — Hunton Andrews Kurth LLP

(57) ABSTRACT

Provided are an image defect detection method and apparatus, an electronic device, a storage medium and a product. The method includes acquiring a to-be-detected image; obtaining a restored image corresponding to the to-be-detected image based on the to-be-detected image, at least one mask image group and a plurality of defect-free positive sample images, where each mask image group includes at least two binary images having a complementary relationship, and different mask image groups have different image sizes; and locating a defect of the to-be-detected image based on the to-be-detected image and each restored image. The solution solves the problem in which a related defect detection method requires numerous manual operations and has a low detection accuracy due to subjective factors of a worker.

17 Claims, 5 Drawing Sheets

(51) Int. Cl.
*G06N 20/00* (2019.01)
*G06T 5/00* (2024.01)
*G06T 5/50* (2006.01)

(52) U.S. Cl.
CPC ...... *G06T 5/50* (2013.01); *G06T 2207/20221* (2013.01)

(58) Field of Classification Search
CPC ... G06T 7/0004; G06T 7/0002; G06T 3/4038; G06T 7/11; G06T 7/136; G06T 2207/10004; G06T 2207/30164; G06F 18/22; G06N 20/00; G06N 3/045; G06N 3/088; G06V 10/82; G06V 20/52
See application file for complete search history.

(56) References Cited

U.S. PATENT DOCUMENTS

| | | | | |
|---|---|---|---|---|
| 11,587,222 | B2* | 2/2023 | Chu | G06F 18/23 |
| 11,676,264 | B2* | 6/2023 | Plihal | G06T 7/001 |
| | | | | 382/149 |
| 11,694,318 | B2* | 7/2023 | Checka | G06T 7/0002 |
| | | | | 382/100 |
| 11,756,182 | B2* | 9/2023 | Fang | G06T 7/001 |
| | | | | 382/149 |
| 11,922,617 | B2* | 3/2024 | Shu | G06T 7/0006 |
| 12,020,418 | B2* | 6/2024 | Chang | G06T 7/001 |
| 2006/0067571 | A1* | 3/2006 | Onishi | G06T 7/001 |
| | | | | 382/149 |
| 2008/0075352 | A1* | 3/2008 | Shibuya | G01N 21/9501 |
| | | | | 382/141 |
| 2011/0194752 | A1 | 8/2011 | Pang | |
| 2013/0336575 | A1 | 12/2013 | Dalla-Torre et al. | |
| 2014/0113220 | A1 | 4/2014 | Chu | |
| 2014/0283591 | A1* | 9/2014 | Takahashi | G01B 11/25 |
| | | | | 73/146 |
| 2015/0331888 | A1* | 11/2015 | Shomair | G06F 18/22 |
| | | | | 382/203 |
| 2016/0042505 | A1* | 2/2016 | Tsuchiya | G06T 7/136 |
| | | | | 382/144 |
| 2019/0068962 | A1* | 2/2019 | Van Schoyck | G05D 1/0088 |
| 2019/0155164 | A1* | 5/2019 | Chen | G01N 21/8851 |
| 2019/0197680 | A1 | 6/2019 | Sakai et al. | |
| 2020/0380899 | A1* | 12/2020 | Wen | G06T 7/0008 |
| 2021/0233248 | A1* | 7/2021 | Li | H04N 5/272 |
| 2021/0390676 | A1* | 12/2021 | Floeder | G06T 3/02 |
| 2021/0390682 | A1* | 12/2021 | Lin | G06V 10/82 |
| 2021/0407062 | A1* | 12/2021 | Su | G06F 18/253 |
| 2022/0036068 | A1* | 2/2022 | Peng | G06V 20/194 |
| 2022/0166377 | A1* | 5/2022 | Wang | G06T 7/0002 |
| 2022/0198228 | A1* | 6/2022 | Kuo | G06F 18/213 |
| 2022/0230323 | A1* | 7/2022 | Liba | G06T 5/60 |
| 2022/0335333 | A1* | 10/2022 | Cao | G06N 3/047 |
| 2022/0360796 | A1* | 11/2022 | Zhou | H04N 19/132 |
| 2022/0383508 | A1* | 12/2022 | Liu | G06V 10/82 |
| 2022/0392101 | A1* | 12/2022 | Lu | G06V 10/82 |
| 2023/0005130 | A1* | 1/2023 | Tang | G06T 7/187 |
| 2023/0086961 | A1* | 3/2023 | Wang | G06T 7/593 |
| | | | | 382/154 |
| 2023/0190095 | A1* | 6/2023 | Bagherinia | G06T 7/11 |
| | | | | 351/200 |
| 2023/0214985 | A1* | 7/2023 | Li | G06N 3/09 |
| | | | | 382/141 |
| 2024/0013369 | A1* | 1/2024 | Tsai | G06T 7/001 |
| 2024/0104696 | A1* | 3/2024 | Tan | G06V 10/26 |

FOREIGN PATENT DOCUMENTS

| | | |
|---|---|---|
| JP | 2003094595 A | 4/2003 |
| JP | 2018155567 A | 10/2018 |

OTHER PUBLICATIONS

Liu, W. "Binary Neural Network for Automated Visual Surface Defect Detection" Intelligent Sensing and Monitoring for Industrial Process, vol. 21, pp. 1-17 (Year: 2021).*

Yapi, D. "A Learning Based Approach for Automatic Defect Detection in Textile Images" IFAC Science Direct 48-3 (2015) pp. 1-6 (Year: 2015).*

First Search Report issued in corresponding Chinese Application No. 2020115634359, dated Oct. 27, 2023 and English translation, 4 pages.

Peng et al, Automatic Inpainting Method of the Missing Region for Meteorological Satellite Cloud Image, J. Chinese Computer Systems 38(4), 2017, 5 pages.

Extended European Search Report, from the European Patent Office, issued to EP Application No. 21193658.8, on Mar. 11, 2022, 8 pages.

* cited by examiner

IMAGE DEFECT DETECTION METHOD FOR LOCATING A DEFECT OF A TO-BE DETECTED IMAGE, ELECTRONIC DEVICE, AND STORAGE MEDIUM

CROSS-REFERENCES TO RELATED APPLICATION

This application claims priority to Chinese Patent Application No. 202011563435.9 filed on Dec. 25, 2020, the disclosure of which is incorporated herein by reference in its entirety.

TECHNICAL FIELD

The present disclosure relates to the field of image processing technology, particularly, but not limited to, the field of defect detection technology and for example, an image defect detection method and apparatus, an electronic device, a storage medium and a product.

BACKGROUND

Defect detection of the appearance of a product is a key link in a production process in the traditional industrial manufacturing industry, for example, steel manufacturing, automobile manufacturing, battery manufacturing, solar panel manufacturing, and parts manufacturing of electronic products including computer products, communication products and consumer products.

How to detect a defect in a collected product image is a key issue of industry concern.

SUMMARY

The present disclosure provides an image defect detection method and apparatus, an electronic device, a storage medium and a product.

According to one aspect of the present disclosure, an image defect detection method is provided. The method includes acquiring a to-be-detected image; obtaining at least one restored image corresponding to the to-be-detected image based on the to-be-detected image, at least one mask image group and a plurality of defect-free positive sample images, where each mask image group includes at least two binary images having a complementary relationship, and different mask image groups have different image sizes; and locating a defect of the to-be-detected image based on the to-be-detected image and each of the at least one restored image.

According to another aspect of the present disclosure, an image defect detection apparatus is provided. The apparatus includes a to-be-detected image acquisition module, a restored image generation module and a defect location module.

The to-be-detected image acquisition module is configured to acquire a to-be-detected image.

The restored image generation module is configured to obtain a restored image corresponding to the to-be-detected image based on the to-be-detected image, at least one mask image group and a plurality of defect-free positive sample images. Each mask image group includes at least two binary images having a complementary relationship, and different mask image groups have different image sizes.

The defect location module is configured to locate a defect of the to-be-detected image based on the to-be-detected image and each of the at least one restored image.

According to another aspect of the present disclosure, an electronic device is provided. The device includes at least one processor and a memory communicatively connected to the at least one processor.

The memory stores instructions executable by the at least one processor to enable the at least one processor to perform the image defect detection method of any embodiment of the present disclosure.

According to another aspect of the present disclosure, a non-transitory computer-readable storage medium is provided. The storage medium stores computer instructions for causing a computer to perform the image defect detection method of any embodiment of the present disclosure.

According to another aspect of the present disclosure, a computer program product is provided. The computer program product includes a computer program which, when executed by a processor, causes the processor to perform the image defect detection method of any embodiment of the present disclosure.

With the solution of the present disclosure, the location accuracy of a defect area in the image can be improved.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure.

DETAILED DESCRIPTION

Example embodiments of the present disclosure, including details of embodiments of the present disclosure, are described hereinafter in conjunction with the drawings to facilitate understanding. The example embodiments are illustrative only. Therefore, it is to be understood by those of ordinary skill in the art that various changes and modifications may be made to the embodiments described herein without departing from the scope and spirit of the present disclosure. Similarly, description of well-known functions and constructions is omitted hereinafter for clarity and conciseness.

Figure 1:
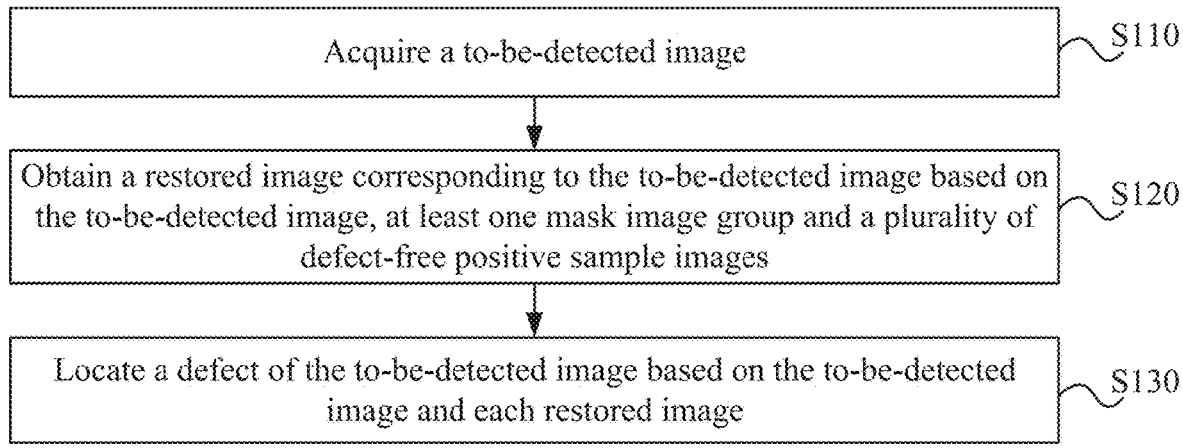
FIG. 1 is a flowchart of an image defect detection method according to an embodiment of the present disclosure.

FIG. 1 is a flowchart of an image defect detection method according to an embodiment of the present disclosure. This embodiment is applicable to defect detection and location of a to-be-detected image. The method may be performed by an image defect detection apparatus. The apparatus may be implemented as at least one of software or hardware and integrated in an electronic device. The electronic device of this embodiment may be, for example, a server, a computer, a smartphone or a tablet computer. Referring to FIG. 1, the method includes the steps below.

In S110, a to-be-detected image is acquired.

The to-be-detected image may be an image of any product collected in a production scenario in the industrial manufacturing industry, for example, an image of the white body of a vehicle, an image of the appearance of a washing machine, an image of the outer surface of a gear or an image of the package of an electronic product. This is not limited in this embodiment.

It is to be noted that the to-be-detected image of this embodiment may or may not include a defect. This is not limited in this embodiment. The defect of the to-be-detected image may be, for example, scratch, dirt or uneven paint. This is not limited in this embodiment.

In an optional implementation of this embodiment, the to-be-detected image may be collected in real time by an image collection device or may be acquired from an image database. This is not limited in this embodiment.

For example, in this embodiment, it is feasible to collect an image of the white body of an automobile in real time by using a camera and then detect whether there is a defect in the collected image of the white body of the automobile. If there is a defect in the collected image of the white body of the automobile, it is feasible to locate a defect area in the image.

In S120, a restored image corresponding to the to-be-detected image is obtained based on the to-be-detected image, at least one mask image group and a plurality of defect-free positive sample images.

Each mask image group includes at least two binary images having a complementary relationship, and different mask image groups have different image sizes.

For example, in this embodiment, one mask image group may include four binary images having a complementary relationship. It is to be noted that in this embodiment, the grayscale values of all pixels of the image obtained by adding up corresponding pixels of the four binary images having a complementary relationship may be, for example, 255, 128 or 96. This is not limited in this embodiment. It is to be noted that in this embodiment, the grayscale values of all pixels of the image obtained by adding up corresponding pixels of multiple binary images having the complementary relationship are the same as one of the grayscale values of the binary images. For example, if the grayscale values of the binary images are 0 and 255, the grayscale values of all pixels of the image obtained by adding up pixels of multiple binary images having the complementary relationship may be 255.

It is also to be noted that in this embodiment, different mask image groups have different image sizes. That is, the sizes of the mask blocks contained in the binary images in different mask image groups are different. One mask block is composed of one or more pixels having a grayscale value of 255 in a binary image. For example, each mask block in a first mask image group is composed of 4×4=16 pixels having a grayscale value of 255, each mask block in a second mask image group is composed of 3×3=9 pixels having a grayscale value of 255, and each mask block in a third mask image group is composed of 2×2=4 pixels having a grayscale value of 255.

The number of mask image groups may be, for example, 3, 4 or 10. This is not limited in this embodiment.

In an optional implementation of this embodiment, after the to-be-detected image is acquired, a restored image corresponding to the to-be-detected image may be obtained based on the to-be-detected image, at least one mask image group and a plurality of defect-free positive sample images. A positive sample image is an image that is related to the acquired to-be-detected image and includes no defect. For example, if the to-be-detected image is an image of the white body of a vehicle including a scratch defect (the to-be-detected image may also be an image of the white body of a vehicle including no defect), a positive sample image is an image of the white body of a defect-free vehicle.

In an optional implementation of this embodiment, a plurality of defect-free positive samples may be unsupervisedly trained so that an image completion model is obtained. The to-be-detected image and the binary images in the mask image groups may be sequentially input to the image completion model so that a restored image corresponding to the to-be-detected image is obtained.

For example, in this embodiment, 100 defect-free positive sample images may be unsupervisedly trained so that an image completion model related to the to-be-detected image is obtained. The to-be-detected image and the binary images in the mask image groups may be sequentially input to the image completion model so that a restored image corresponding to the to-be-detected image is obtained.

It is to be noted that in this embodiment, the restored image corresponding to the to-be-detected image is a defect-free image that corresponds to the to-be-detected image and includes no defect. For example, if the to-be-detected image is an image of the appearance of a washing machine including a scratch, the restored image corresponding to the to-be-detected image is an image of the appearance of the washing machine including no scratch; and if the to-be-detected image is an image of the appearance of a washing machine including no scratch, the restored image corresponding to the to-be-detected image is the same as the to-be-detected image.

In S130, a defect of the to-be-detected image is located based on the to-be-detected image and each restored image.

In an optional implementation of this embodiment, after the restored image corresponding to the to-be-detected image is obtained, a defect of the to-be-detected image may be located based on the to-be-detected image and the restored image corresponding to the to-be-detected image so that the defect location information of the to-be-detected image is acquired.

In an optional implementation of this embodiment, after the restored image corresponding to the to-be-detected image is obtained, the difference between the to-be-detected defective image and the restored image may be calculated, and a defect of the to-be-detected image may be located based on the calculation result.

For example, it is assumed that the to-be-detected image is image A, the restored image corresponding to image A is image B, and image A minus image B is image C. Image C includes only a defect (for example, a scratch defect) included in image A. It is possible to locate a defect included in image C, that is, implement defect location of image A, simply by performing binary segmentation of image C (for example, first binarizing image C and then segmenting the binarized image C). It is to be understood that if image A includes no defect, image C is an all-black image (each pixel has a grayscale value of 0).

The solution of this embodiment includes acquiring a to-be-detected image; obtaining a restored image corresponding to the to-be-detected image based on the to-be-detected image, at least one mask image group and a plurality of defect-free positive sample images, where each mask image group includes at least two binary images having a complementary relationship, and different mask image groups have different image sizes; and locating a defect of the to-be-detected image based on the to-be-detected image and each restored image. The solution solves the problem in which a related defect detection method requires numerous manual operations and has a low detection accuracy due to subjective factors of a worker. With the solution, the defect of the image can be located at the pixel level, the detection accuracy is higher, and a large amount of labor cost can be saved.

Figure 2:
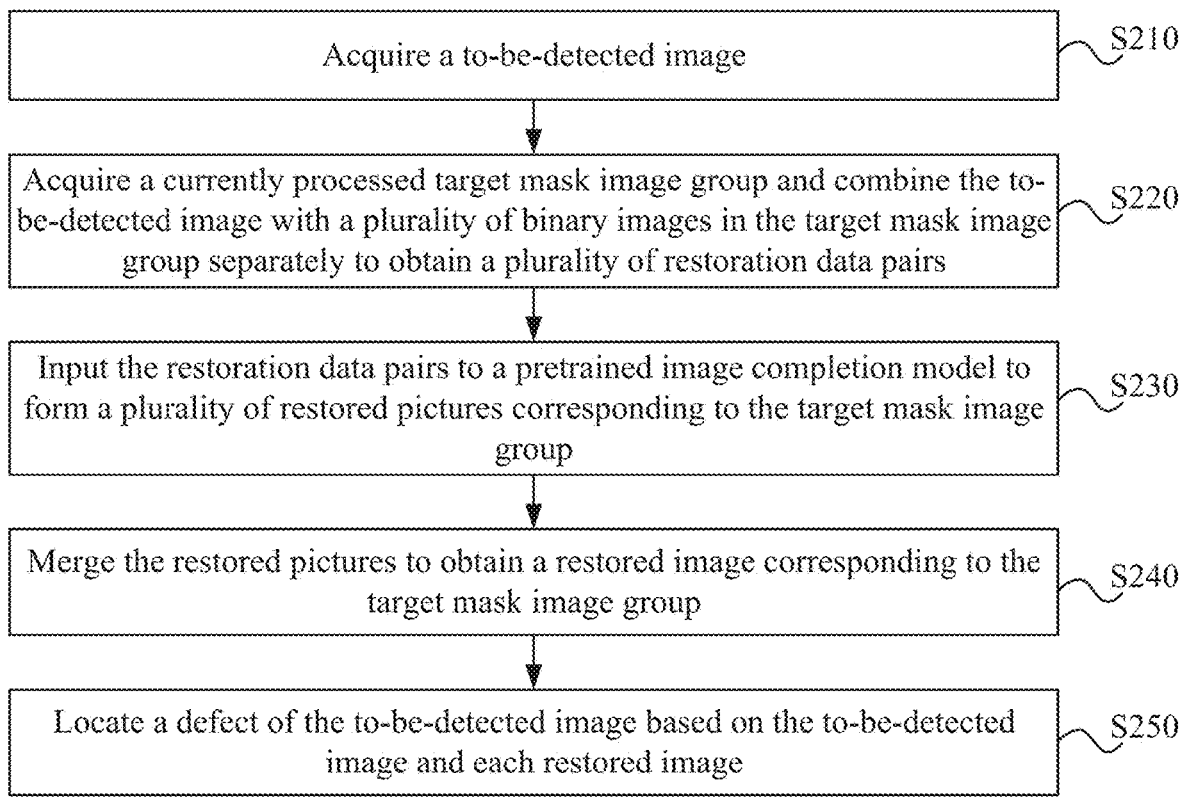
FIG. 2 is a flowchart of another image defect detection method according to an embodiment of the present disclosure.

FIG. 2 is a flowchart of another image defect detection method according to an embodiment of the present disclosure. This embodiment is a detailed description of the preceding solution. The solution of this embodiment may be combined with an optional solution of the preceding one or more embodiments. As shown in FIG. 2, the image defect detection method includes the steps below.

In S210, a to-be-detected image is acquired.

In S220, a currently processed target mask image group is acquired, and the to-be-detected image is combined with a plurality of binary images in the target mask image group separately so that a plurality of restoration data pairs are obtained.

The target mask image group is any one of at least one mask image group. This is not limited in this embodiment.

In an optional implementation of this embodiment, the currently processed target mask image group may be acquired, and the to-be-detected image may be combined with a plurality of binary images in the target mask image group separately so that a plurality of restoration data pairs may be obtained.

For example, if the target mask image group includes four binary images having a complementary relationship, for example, binary image A, binary image B, binary image C and binary image D that are having a complementary relationship, then it is feasible to combine the to-be-detected image with binary image A to obtain a first restoration data pair, to combine the to-be-detected image with binary image B to obtain a second restoration data pair, to combine the to-be-detected image with binary image C to obtain a third restoration data pair, and to combine the to-be-detected image with binary image D to obtain a fourth restoration data pair.

In S230, the restoration data pairs are input to a pretrained image completion model to form a plurality of restored pictures corresponding to the target mask image group.

The image completion model is obtained by training the positive sample images.

In an optional implementation of this embodiment, the positive sample images may be unsupervisedly trained so that the image completion model is obtained.

In an optional implementation of this embodiment, after the to-be-detected image is combined with a plurality of binary images in the target mask image group separately so that a plurality of restoration data pairs are obtained, the obtained restoration data pairs may be input to a pretrained image completion model so that a plurality of restored pictures corresponding to the target mask image group may be formed.

For example, in the preceding example, after the first restoration data pair, the second restoration data pair, the third restoration data pair and the fourth restoration data pair are obtained, the four restoration data pairs may be input to an image completion model obtained in advance by training a plurality of positive sample images. In this manner, a first restored picture corresponding to the first restoration data pair, a second restored picture corresponding to the second restoration data pair, a third restored picture corresponding to the third restoration data pair and a fourth restored picture corresponding to the fourth restoration data pair may be generated.

In S240, the restored pictures are merged so that a restored image corresponding to the target mask image group is obtained.

In an optional implementation of this embodiment, after a plurality of restored pictures corresponding to the target mask image group are obtained, the obtained restored pictures may be merged to form a restored image corresponding to the target mask image group.

For example, in the preceding example, after the first restored picture, the second restored picture, the third restored picture and the fourth restored picture are obtained, the four restored pictures may be merged to form a restored image corresponding to the target mask image group.

In an optional implementation of this embodiment, the step in which the restored pictures are merged so that the restored image corresponding to the target mask image group is obtained may be performed in the following manner: Each restored picture is multiplied by a binary image included in the target mask image group and corresponding to the each restored picture so that a plurality of reference images are obtained; and the reference images are added up so that the restored image corresponding to the target mask image group is obtained.

For example, in the preceding example, it is feasible to multiply the first restored picture by binary image A to obtain reference image A, to multiply the second restored picture by binary image B to obtain reference image B, to multiply the third restored picture by binary image C to obtain reference image C, and to multiply the fourth restored picture by binary image D to obtain reference image D.

Reference image A, reference image B, reference image C and reference image D may be added up to form the restored image corresponding to the target mask image group.

It is to be understood that at least two binary images in the target mask image group are having a complementary relationship. That is, if the grayscale values of all pixels of the image obtained by adding up the binary images are all 255, then in this embodiment, the image obtained by adding up the restored pictures multiplied by the binary images one to one is also a restored image corresponding to the to-be-detected image.

This configuration has the advantage of improving the sharpness of the restored image, providing a basis for accurate location of a defect area in the to-be-detected image.

In S250, a defect of the to-be-detected image is located based on the to-be-detected image and each restored image.

In an optional implementation of this embodiment, after the restored image corresponding to each mask image group is obtained, the deviation of each restored image from the to-be-detected image may be calculated, and a defect area may be accurately located in the to-be-detected image based on all obtained deviations.

In the solution of this embodiment, the currently processed target mask image group is acquired, and the to-be-detected image is combined with a plurality of binary images in the target mask image group separately so that a plurality of restoration data pairs are obtained; the restoration data pairs are input to a pretrained image completion model to form a plurality of restored pictures corresponding to the target mask image group; the restored pictures are merged so that a restored image corresponding to the target mask image group is obtained; and a defect of the to-be-detected image is located based on the to-be-detected image and each restored image. In this manner, a defect area in the to-be-detected image can be located more accurately with no operation performed by a worker.

Figure 3:
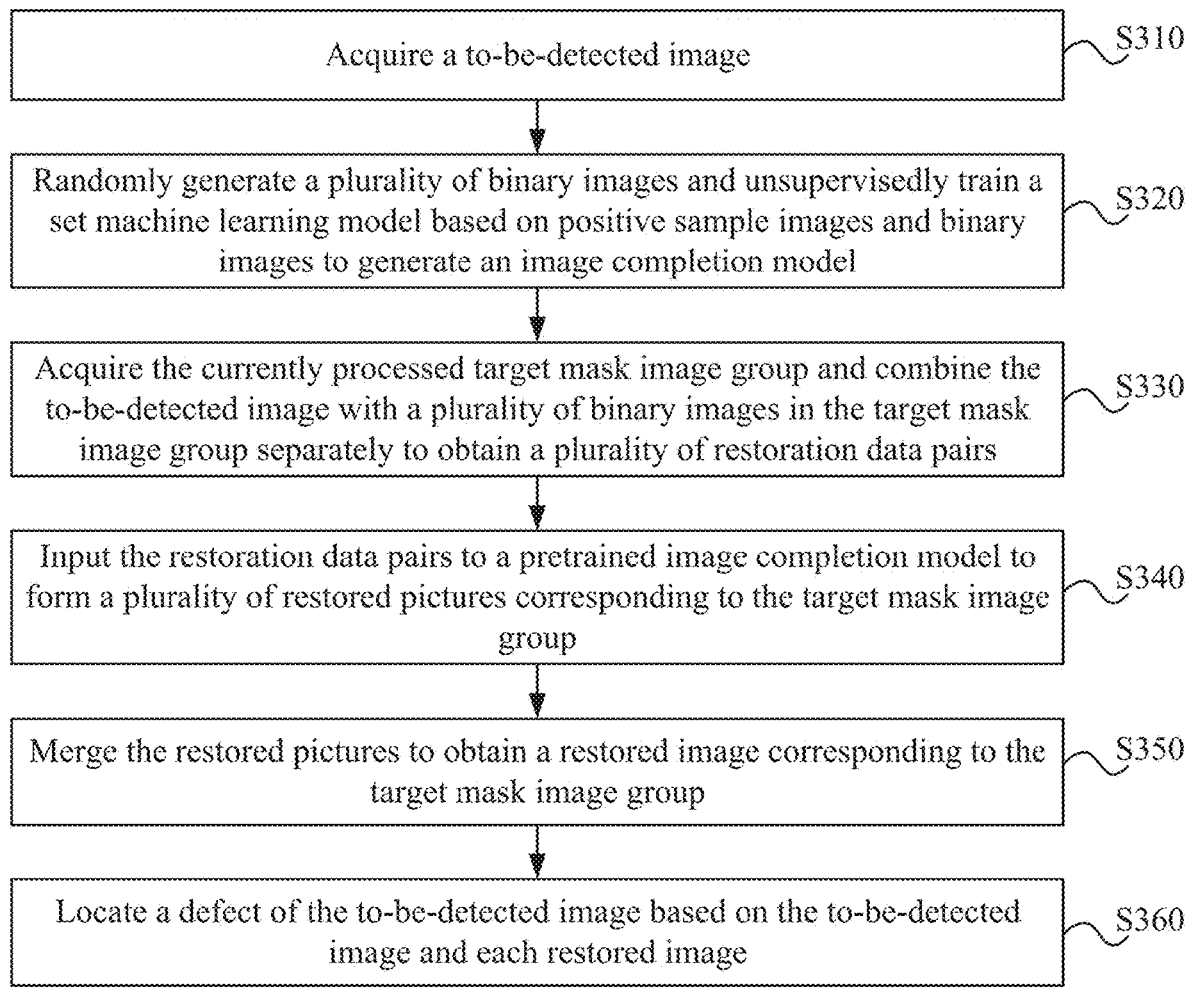
FIG. 3 is a flowchart of another image defect detection method according to an embodiment of the present disclosure.

FIG. 3 is a flowchart of another image defect detection method according to an embodiment of the present disclosure. This embodiment is a detailed description of the preceding solution. The solution of this embodiment may be combined with an optional solution of the preceding one or more embodiments. As shown in FIG. 3, the image defect detection method includes the steps below.

In S310, a to-be-detected image is acquired.

In S320, a plurality of binary images are randomly generated, and a set machine learning model is unsupervisedly trained based on positive sample images and binary images to generate an image completion model.

In an optional implementation of this embodiment, before the data pairs are input to the pretrained image completion model, a plurality of binary images are randomly generated. The number of the binary images may be equal to or greater than the number of the positive sample images. It is to be noted that in this embodiment, the size of each binary image is the same as the size of each positive sample image. For example, if the size of each positive sample image is 512×512, the size of each randomly generated binary image is also 512×512. This configuration has the advantage of facilitating subsequent generation of the image completion model.

The set machine learning model may be unsupervisedly trained based on the positive sample images and the binary images to generate the image completion model. The set machine learning model may be an encoder-decoder model or may be another machine learning model. This is not limited in this embodiment.

The step in which the set machine learning model is unsupervisedly trained based on the positive sample images and the binary images to generate the image completion model may include that one positive sample image and one binary image are selected, and each pixel of one positive sample image is multiplied by a corresponding pixel of one binary image so that one defective image is obtained; the defective image is merged with the selected binary image so that one four-channel target image is obtained; the target image is input to the machine learning model to train the machine learning model; and the process returns to the selecting one positive sample image and one binary image until a training termination condition is satisfied, so that the image completion model is obtained.

In this manner, the accuracy of the image completion model is improved, and a basis for subsequent generation of a sharper restored image corresponding to the to-be-detected image is provided.

In an optional implementation of this embodiment, one positive sample image may be randomly selected from a plurality of positive sample images, and one binary image may be randomly selected from a plurality of randomly generated binary images. The selected positive sample image may be multiplied by the selected binary image. That is, each pixel of the positive sample image is multiplied by a corresponding pixel of the binary image. In this manner, one defective image is obtained. It is to be understood that the grayscale value of the binary image is only 0 or 1, and in the defective image obtained by multiplying the positive sample image by the binary image, only pixels corresponding to pixels whose grayscale values are 1 in both the positive sample image and the binary image remain.

The generated defective image may be merged with the selected binary image so that one four-channel target image may be obtained. For example, if the three RGB channels of pixel at the position of (128, 128) in the defective image are (128, 251, 96), the four RGB channels of pixel at the position of (128, 128) in the target image obtained after the defective image is merged with the selected binary image may be (128, 251, 96, 0).

The generated target image may be input to the machine learning model to train the machine learning model; and the process may return to the selecting one positive sample image and one binary image until a training termination condition is satisfied, so that the image completion model is obtained. The training termination condition may be that the value of a loss function is less than a set threshold or that the number of iterations satisfies a set threshold. This is not limited in this embodiment.

In another optional implementation of this embodiment, after one positive sample image and one binary image are selected, and each pixel of one positive sample image is multiplied by a corresponding pixel of one binary image so that one defective image is obtained, it is feasible not to generate the target image but to input the defective image and the selected binary image to the machine learning model to train the machine learning model.

In S330, the currently processed target mask image group is acquired, and the to-be-detected image is combined with a plurality of binary images in the target mask image group separately so that a plurality of restoration data pairs are obtained.

In S340, the restoration data pairs are input to a pretrained image completion model to form a plurality of restored pictures corresponding to the target mask image group.

The image completion model may be obtained through step S320.

In S350, the restored pictures are merged so that a restored image corresponding to the target mask image group is obtained.

In S360, a defect of the to-be-detected image is located based on the to-be-detected image and each restored image.

Before the restoration data pairs are input to a pretrained image completion model, the solution of this embodiment includes that a plurality of binary images are randomly generated, and a set machine learning model is unsupervisedly trained based on positive sample images and binary images to generate an image completion model. The defective image does not need to be tagged. The image completion model can be generated simply based on the positive sample images and the randomly generated binary images. In this manner, a basis is provided for subsequent location of a defect area in the to-be-detected image, and a large amount of labor cost can be saved.

Figure 4:
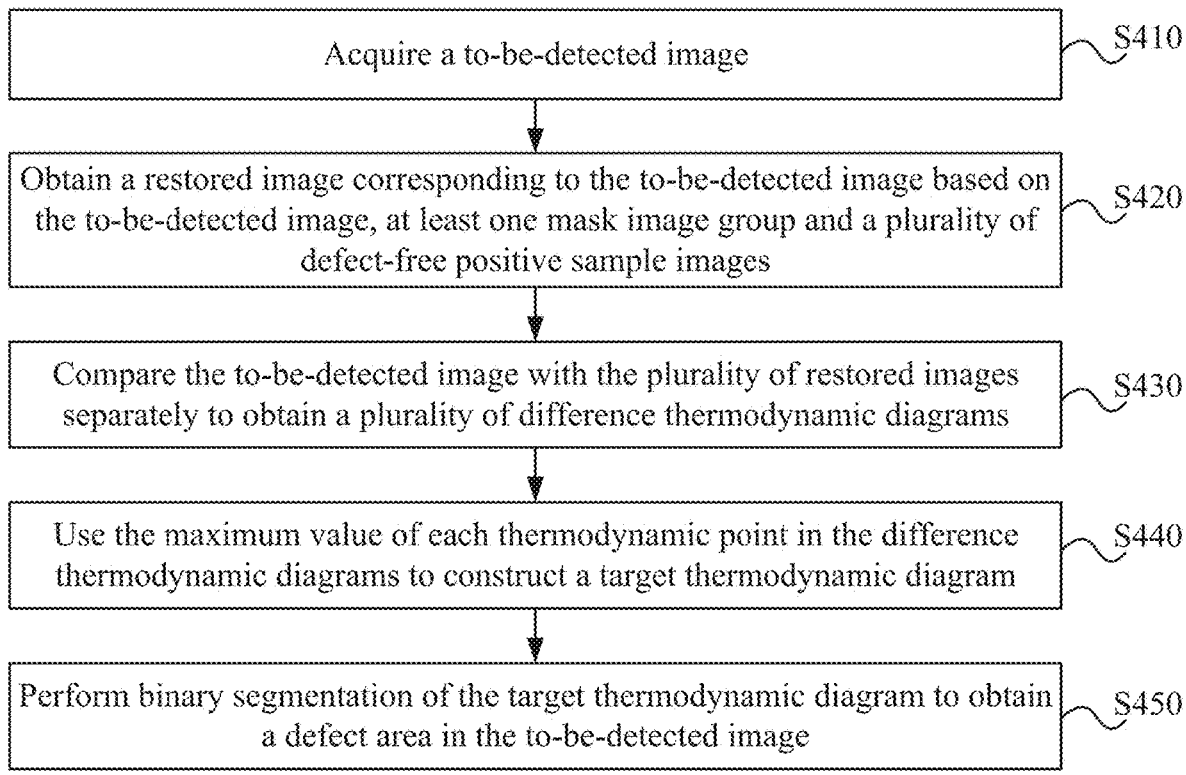
FIG. 4 is a flowchart of another image defect detection method according to an embodiment of the present disclosure.

FIG. 4 is a flowchart of another image defect detection method according to an embodiment of the present disclosure. This embodiment is a detailed description of the preceding solution. The solution of this embodiment may be combined with an optional solution of the preceding one or more embodiments. As shown in FIG. 4, the image defect detection method includes the steps below.

In S410, a to-be-detected image is acquired.

In S420, a restored image corresponding to the to-be-detected image is obtained based on the to-be-detected image, at least one mask image group and a plurality of defect-free positive sample images.

In S430, the to-be-detected image is compared with the plurality of restored images separately so that a plurality of difference thermodynamic diagrams are obtained.

In an optional implementation of this embodiment, after restored images corresponding to mask image groups and directed at the to-be-detected image are obtained, the to-be-detected image may be compared with the restored images separately so that a plurality of difference thermodynamic diagrams may be obtained.

For example, if three restored images (restored image A, restored image B and restored image C) corresponding to three mask image groups and directed at the to-be-detected image are obtained, it is feasible to compare the difference between restored image A and the to-be-detected image to obtain difference thermodynamic diagram A, to compare the difference between restored image B and the to-be-detected image to obtain difference thermodynamic diagram B and to compare the difference between restored image C and the to-be-detected image to obtain difference thermodynamic diagram C.

In an optional implementation of this embodiment, it is feasible to determine a gradient magnitude similarity deviation between the to-be-detected image and the plurality of restored images separately and obtain the difference thermodynamic diagrams based on the determination result of the similarity deviation.

For example, it is feasible to determine a gradient magnitude similarity deviation between restored image A and the to-be-detected image and obtain difference thermodynamic diagram A based on the calculation result; to determine a gradient magnitude similarity deviation between restored image B and the to-be-detected image and obtain difference thermodynamic diagram B based on the calculation result; and to determine a gradient magnitude similarity deviation between restored image C and the to-be-detected image and obtain difference thermodynamic diagram C based on the calculation result.

In this manner, it is feasible to perform a quick comparison of the difference between the to-be-detected image and the restored images separately, thereby providing a basis for location of a defect area in the to-be-detected image.

It is to be noted that in another optional implementation of this embodiment, it is feasible to determine the difference between the to-be-detected image and the restored images separately by using another difference measurement algorithm (for example, L1 difference measurement algorithm) to obtain the difference thermodynamic diagrams.

In S440, the maximum value of each thermodynamic point in the difference thermodynamic diagrams is used to construct a target thermodynamic diagram.

In an optional implementation of this embodiment, after the difference thermodynamic diagrams are obtained, the maximum value of each thermodynamic point in the difference thermodynamic diagrams may be used to construct a target thermodynamic diagram.

For example, if three difference thermodynamic diagrams are obtained in step S430, it is feasible to determine the maximum value of each thermodynamic point in the three difference thermodynamic diagrams in sequence. For example, it is feasible to determine the maximum value of a first thermodynamic point in the three difference thermodynamic diagrams and use the determined maximum value as the thermodynamic value of the first thermodynamic point in the target thermodynamic diagram.

In S450, binary segmentation of the target thermodynamic diagram is performed so that a defect area in the to-be-detected image is obtained.

In an optional implementation of this embodiment, after the target thermodynamic diagram is constructed, binary segmentation of the target thermodynamic diagram may be performed so that a defect area in the to-be-detected image may be obtained.

In the solution of this embodiment, after a plurality of restored images corresponding to the to-be-detected image are obtained based on different mask image groups, the to-be-detected image may be compared with the plurality of restored images separately so that a plurality of difference thermodynamic diagrams may be obtained, the maximum value of each thermodynamic point in the difference thermodynamic diagrams may be used to construct a target thermodynamic diagram, and binary segmentation of the target thermodynamic diagram may be performed so that a defect area in the to-be-detected image may be obtained. In this manner, a defect area in the to-be-detected image can be accurately located.

Figure 5:
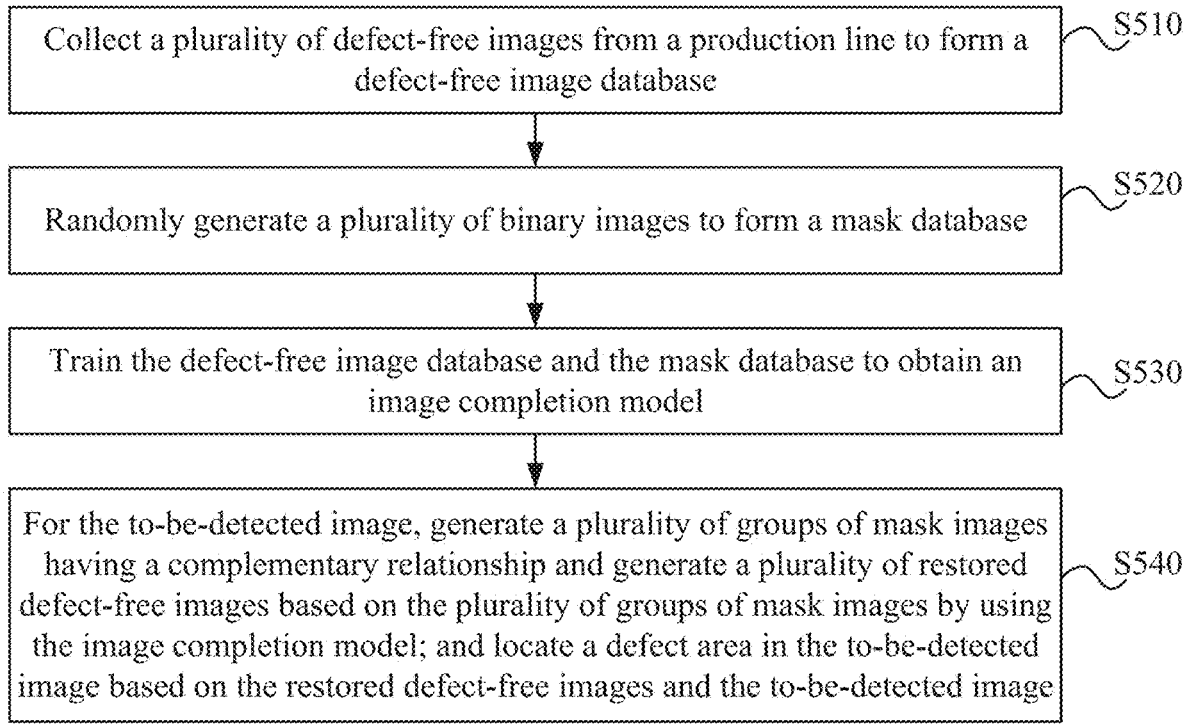
FIG. 5 is a flowchart of an image defect detection method according to an embodiment of the present disclosure.

To facilitate a better understanding of the image defect detection method of the present disclosure by those skilled in the art, FIG. 5 is a flowchart of an image defect detection method according to an embodiment of the present disclosure. As shown in FIG. 5, the method includes the steps below.

In S510, a plurality of defect-free images are collected from a production line to form a defect-free image database.

The defect-free images are positive sample images of embodiments of the present disclosure.

In S520, a plurality of binary images are randomly generated to form a mask database.

In S530, the defect-free image database and the mask database are trained so that an image completion model is obtained.

The image completion model obtained by training can automatically perform image completion of an unknown region in a mask image. It is to be understood that in this embodiment, training image data sets are all defect-free images; and therefore, result images completed by the image completion model are all defect-free images.

Figure 6:
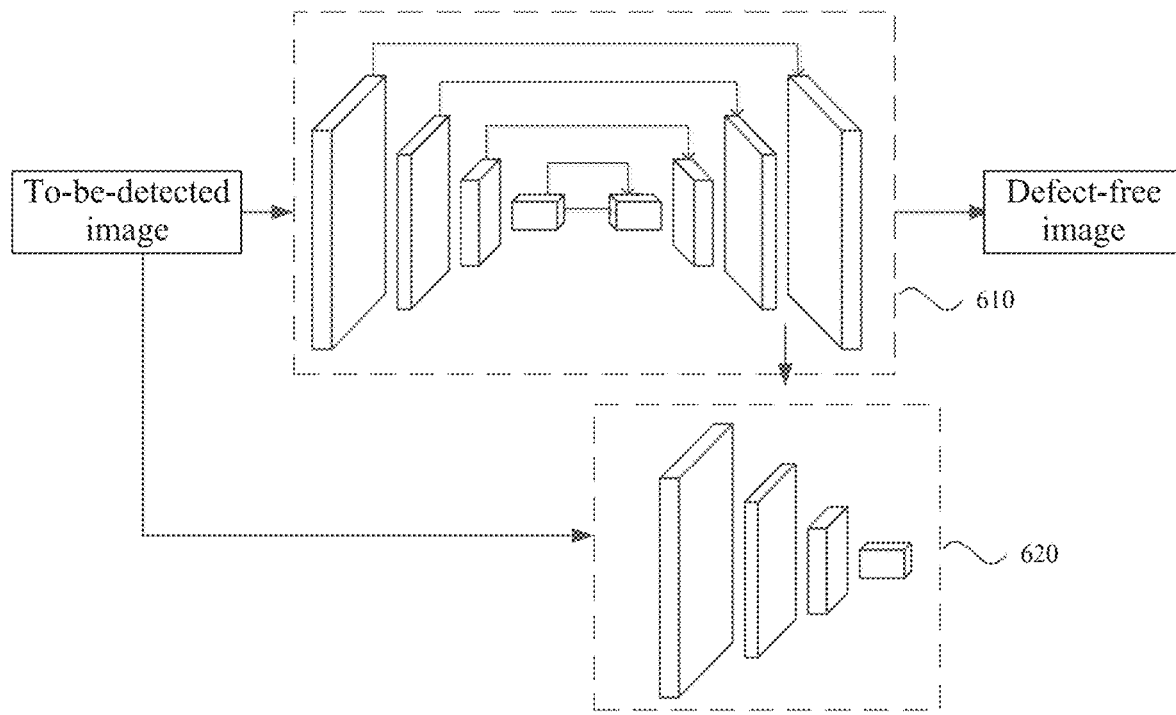
FIG. 6 is a network architecture diagram of an image completion model according to an embodiment of the present disclosure.

FIG. 6 is a network architecture diagram of an image completion model according to an embodiment of the present disclosure. As shown in FIG. 6, the network architecture of the image completion model includes an encoder-decoder network 610 and a discriminator 620. The encoder-decoder network 610 is configured to reconstruct an image. The discriminator 620 is configured to improve the sharpness of the reconstructed result image.

Optionally, in a training process, it is feasible to randomly select one defect-free image from a defect-free image database and randomly select one mask image from a mask database, to multiply the two images to obtain one mask defective image, and then to merge the obtained defective image and the selected mask image into one four-channel target image and use the four-channel target image as input of a network model. In this embodiment, the defect-free image may be used as the ground truth of the model.

In S540, for the to-be-detected image, a plurality of groups of mask images having a complementary relationship are generated, and a plurality of restored defect-free images are generated based on the plurality of groups of mask images by using the image completion model; and a defect area in the to-be-detected image is located based on the restored defect-free images and the to-be-detected image.

Figure 7:
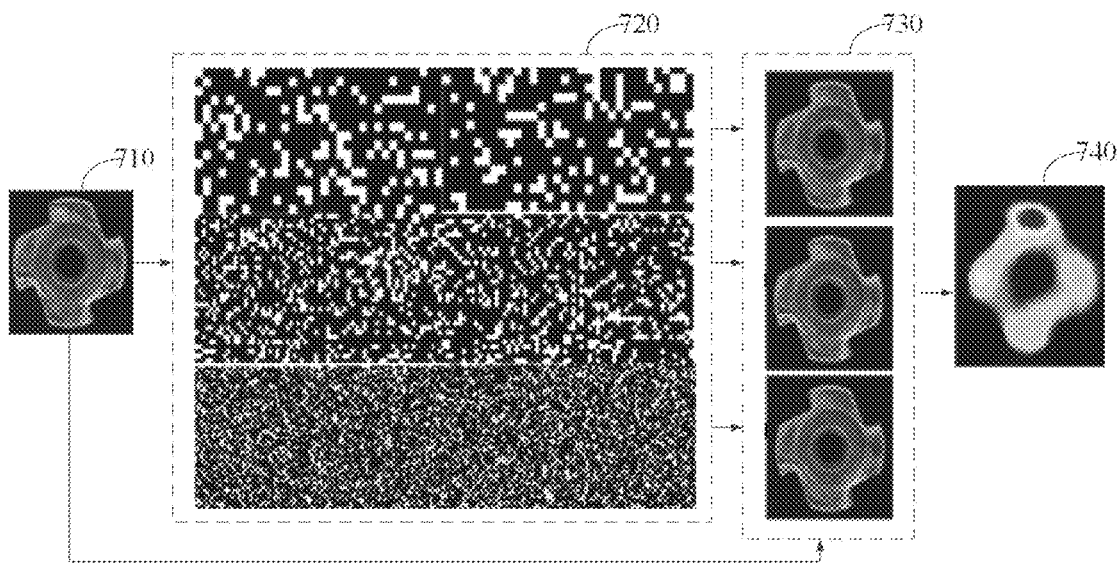
FIG. 7 is an architecture diagram illustrating defect location of a to-be-detected image according to an embodiment of the present disclosure.

FIG. 7 is an architecture diagram illustrating defect location of a to-be-detected image according to an embodiment of the present disclosure. As shown in FIG. 7, 710 indicates the to-be-detected image, 720 indicates randomly generated three mask image groups, each mask image group includes four binary images having a complementary relationship, binary images in different mask image groups are of different image sizes, and 730 indicates a plurality of completion result images obtained in the following manner: mask images in the mask image groups and the to-be-detected image are input to the preceding trained image completion model and predicted.

It is feasible to compare the original to-be-detected image with each reconstructed restored image and evaluate the difference between two images. For example, it is feasible to determine a gradient magnitude similarity deviation between two images to obtain a plurality of difference thermodynamic diagrams (not shown in FIG. 7), to determine the maximum value of each location in the difference thermodynamic diagrams to obtain a final difference thermodynamic diagram 740, and to binarize and segment the final difference thermodynamic diagram 740 to obtain a defect area.

A related quality inspection system has three modes in defect application discovery. A first mode is manual quality inspection. In the first mode, an industry expert makes a judgment by observing photographs in a production environment through naked eyes. A second mode is machine-assisted manual quality inspection. In the second mode, a quality inspection system having a certain judgment capability filters out defect-free photographs, and then an industry expert detects and judges suspected defective photographs. The second mode is mostly developed from an expert system and a feature engineering system. In the second mode, the expert solidifies experience in the quality inspection system, and the quality inspection system has a certain automation capability. A third mode is a defect discovery technology based on deep learning, that is a technology which implement defect detection through mass defect data collection, tagging, model training, prediction and the like. In some scenarios, the detection efficiency is effectively improved, and the detection quality is ensured by using the third mode.

In the first mode, manual quality inspection is performed by the expert on a production site, and a detected defect is recorded manually before being processed. In this mode, the quality inspection efficiency is low, a misjudgment easily occurs, data is difficult to mine and utilize for the second time, and the adverse industrial production environment adversely affects people's health and safety. The features and judgment rules of the second mode are solidified in a machine based on experience and difficult to iterate with business development. As a result, with the development of manufacturing techniques, the system has an increasingly low inspection accuracy or even is reduced to the state of being completely unavailable. The third mode is the main method for upgrading industrial manufacturing intelligence currently. In the third mode, processes including mass defect data collection, data tagging, model training, and prediction are used, the effect of a model mostly depends on the magnitude of defect data and the quality of tagging. Moreover, unknown defects in new forms emerge unceasingly, and defect data is difficult to collect at the initial stage of a project. As a result, the model effect often reaches a bottleneck quickly. Deep learning requires mass defect data. A real production line is likely to lack sufficient defect samples. Moreover, defect data based on manual tagging is mostly data about manual visual inspection or data about quality inspection assisted by a semi-automatically optical instrument. The high tagging speed easily results in a misjudgment caused by fatigue of a quality inspector. Different quality inspectors have different judgment criteria. As a result, the tagging cost is high, and the tagging quality is difficult to guarantee.

According to the present disclosure, it is feasible to model by using product positive sample images collected on a production line by an image collection device, to detect and judge the surface quality of the product, and to locate a defect at the pixel level if the current product collected by the image collection device has a quality problem. The present disclosure is applicable to any image defect detection scenario. The present disclosure can solve the problem in which in a related defect detection method, a large number of manual operations are required, and the detection accuracy is low due to subjective factors of an operator. With the present disclosure, a defect in an image can be located at the pixel level, the detection accuracy is relatively high, and a large amount of labor cost can be saved.

Figure 8:
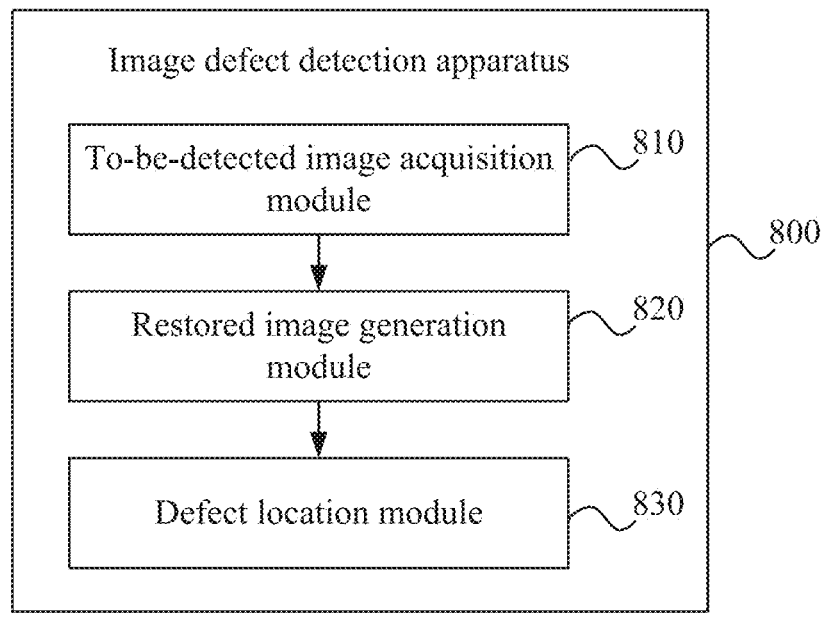
FIG. 8 is a diagram illustrating the structure of an image defect detection apparatus according to an embodiment of the present disclosure.

FIG. 8 is a diagram illustrating the structure of an image defect detection apparatus according to an embodiment of the present disclosure. The apparatus can perform the image defect detection method of any embodiment of the present disclosure. Referring to FIG. 8, the image defect detection apparatus 800 includes a to-be-detected image acquisition module 810, a restored image generation module 820 and a defect location module 830.

The to-be-detected image acquisition module 810 is configured to acquire a to-be-detected image.

The restored image generation module 820 is configured to obtain a restored image corresponding to the to-be-detected image based on the to-be-detected image, at least one mask image group and a plurality of defect-free positive sample images. Each mask image group includes at least two binary images having a complementary relationship, and different mask image groups have different image sizes.

The defect location module 830 is configured to locate a defect of the to-be-detected image based on the to-be-detected image and each restored image.

With the solution of this embodiment, the image defect detection apparatus can acquire the to-be-detected image through the to-be-detected image acquisition module, obtain the restored image corresponding to the to-be-detected image through the restored image generation module and locate the defect of the to-be-detected image through the defect location module. The solution solves the problem in which a related defect detection method requires numerous manual operations and has a low detection accuracy due to subjective factors of a worker. With the solution, the defect of the image can be located at the pixel level, the detection accuracy is high, and a large amount of labor cost can be saved.

In an optional implementation of this embodiment, the restored image generation module 820 includes a restoration data pair generation submodule, a multi-restored-image generation submodule and a restored image generation submodule.

The restoration data pair generation submodule is configured to acquire the currently processed target mask image group and combine the to-be-detected image with a plurality of binary images in the target mask image group separately to obtain a plurality of restoration data pairs.

The multi-restored-image generation submodule is configured to input the restoration data pairs to a pretrained image completion model to form a plurality of restored pictures corresponding to the target mask image group. The image completion model is obtained by training the positive sample images.

The restored image generation submodule is configured to merge the restored pictures to obtain a restored image corresponding to the target mask image group.

In an optional implementation of this embodiment, the restored image generation submodule is configured to multiply each restored picture of the restored pictures by a binary image included in the target mask image group and corresponding to the each restored picture to obtain a plurality of reference images; and add up the reference images to obtain the restored image corresponding to the target mask image group.

In an optional implementation of this embodiment, the restored image generation module 820 further includes an image completion model generation submodule configured to randomly generate a plurality of binary images; and unsupervisedly train a set machine learning model based on the positive sample images and the binary images to generate the image completion model.

In an optional implementation of this embodiment, the image completion model generation submodule is configured to select one positive sample image and one binary image and multiply each pixel of the positive sample image by a corresponding pixel of the binary image to obtain one defective image; merge the defective image with the selected binary image to obtain one four-channel target image; input the target image to the machine learning model to train the machine learning model; and return to the operation of selecting one positive sample image and one binary image until a training termination condition is satisfied, so as to obtain the image completion model.

In an optional implementation of this embodiment, the defect location module 830 includes a multi-difference-thermodynamic-diagram generation submodule, a target thermodynamic diagram construction module and a defect area determination submodule.

The multi-difference-thermodynamic-diagram generation submodule is configured to compare the to-be-detected image with the plurality of restored images separately to obtain the difference thermodynamic diagrams.

The target thermodynamic diagram construction module is configured to use the maximum value of each thermodynamic point in the difference thermodynamic diagrams to construct a target thermodynamic diagram.

The defect area determination submodule is configured to perform binary segmentation of the target thermodynamic diagram to obtain a defect area in the to-be-detected image.

In an optional implementation of this embodiment, the multi-difference-thermodynamic-diagram generation submodule is configured to determine a gradient magnitude similarity deviation between the to-be-detected image and the plurality of restored images separately and obtain the difference thermodynamic diagrams based on the determination result of the similarity deviation.

The image defect detection apparatus can perform the image defect detection method provided in any embodiment of the present disclosure and has function modules and beneficial effects corresponding to the performed image defect detection method. For technical details not described in detail in this embodiment, see the image defect detection method provided in any embodiment of the present disclosure.

According to an embodiment of the present disclosure, the present disclosure further provides an electronic device, a readable storage medium and a computer program product.

Figure 9:
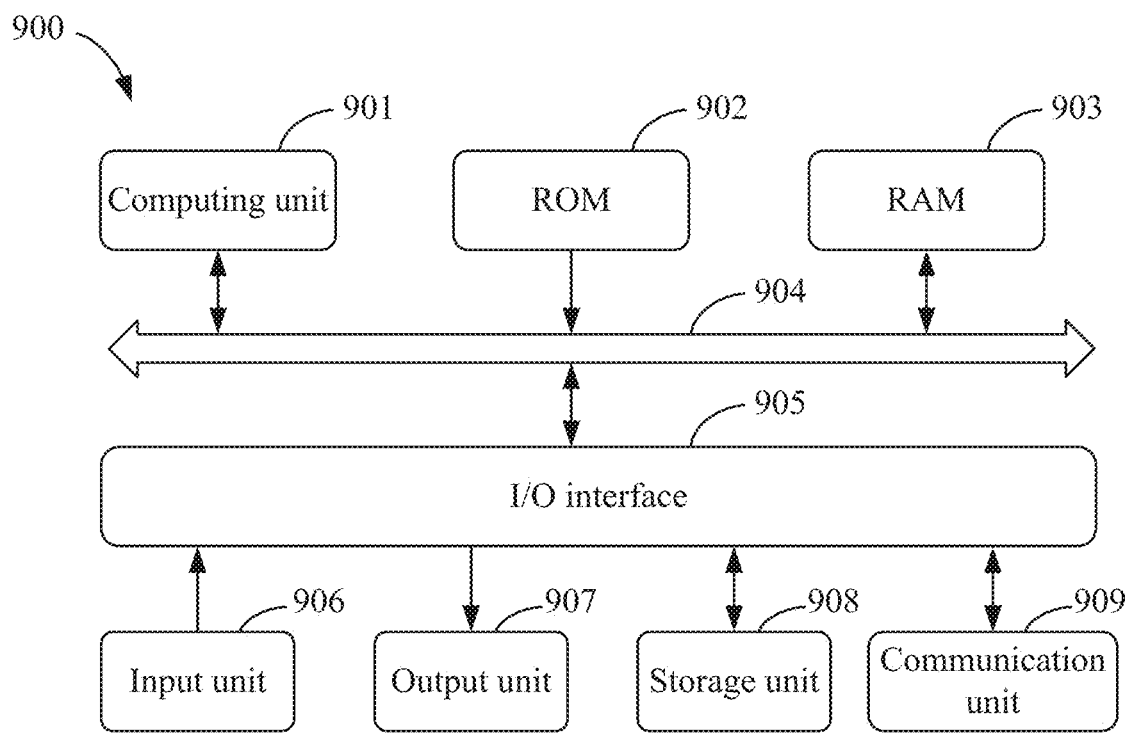
FIG. 9 is a block diagram of an electronic device for implementing an image defect detection method according to an embodiment of the present disclosure.

FIG. 9 is a block diagram of an electronic device 900 for implementing an image defect detection method according to an embodiment of the present disclosure. Electronic devices are intended to represent various forms of digital computers, for example, laptop computers, desktop computers, worktables, personal digital assistants, servers, blade servers, mainframe computers and other applicable computers. Electronic devices may also represent various forms of mobile devices, for example, personal digital assistants, cellphones, smartphones, wearable devices and other similar computing devices. Herein the shown components, the connections and relationships between these components, and the functions of these components are illustrative only and are not intended to limit the implementation of the present disclosure as described and/or claimed herein.

As shown in FIG. 9, the device 900 includes a computing unit 901. The computing unit 901 can perform various appropriate actions and processing according to a computer program stored in a read-only memory (ROM) 902 or a computer program loaded into a random-access memory (RAM) 903 from a storage unit 908. The RAM 903 can also store various programs and data required for operations of the device 900. The computing unit 901, the ROM 902 and the RAM 903 are connected to each other by a bus 904. An input/output (I/O) interface 905 is also connected to the bus 904.

Multiple components in the device 900 are connected to the I/O interface 905. The multiple components include an input unit 906 such as a keyboard or a mouse; an output unit 907 such as a display or a speaker; a storage unit 908 such as a magnetic disk or an optical disk; and a communication unit 909 such as a network card, a modem or a wireless communication transceiver. The communication unit 909 allows the device 900 to exchange information/data with other devices over a computer network such as the Internet and/or over various telecommunication networks.

The computing unit 901 may be a general-purpose and/or special-purpose processing component having processing and computing capabilities. Examples of the computing unit 901 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller and microcontroller. The computing unit 901 performs various preceding methods and processing, such as image defect detection. For example, in some embodiments, image defect detection may be implemented as a computer software program tangibly contained in a machine-readable medium, for example, the storage unit 908. In some embodiments, part or all of computer programs can be loaded and/or installed on the device 900 via the ROM 902 and/or the communication unit 909. When the computer program is loaded into the RAM 903 and executed by the computing unit 901, one or more steps of the preceding image defect detection can be performed. Alternatively, in other embodiments, the computing unit 901 may be configured to perform image defect detection in any other appropriate manner (for example, by use of firmware).

The preceding various embodiments of systems and techniques may be implemented in digital electronic circuitry, integrated circuitry, a field-programmable gate array (FPGA), an disclosure-specific integrated circuit (ASIC), an disclosure-specific standard product (ASSP), a system on a chip (SoC), a complex programmable logic device (CPLD), computer hardware, firmware, software and/or any combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device and transmitting the data and instructions to the memory system, the at least one input device and the at least one output device.

Program codes for implementation of the method of the present disclosure may be written in any combination of one or more programming languages. These program codes may be provided for the processor or controller of a general-purpose computer, a special-purpose computer or another programmable data processing device to enable functions/operations specified in a flowchart and/or a block diagram to be implemented when the program codes are executed by the processor or controller. The program codes may all be executed on a machine; may be partially executed on a machine; may serve as a separate software package that is partially executed on a machine and partially executed on a remote machine; or may all be executed on a remote machine or a server.

In the context of the present disclosure, the machine-readable medium may be a tangible medium that contains or stores a program available for an instruction execution system, apparatus or device or a program used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any appropriate combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display device (for example, a cathode-ray tube (CRT) or liquid-crystal display (LCD) monitor) for displaying information to the user; and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on the respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present disclosure are within the scope of the present disclosure.

What is claimed is:

1. An image defect detection method for locating a defect of a to-be-detected image, comprising:
    acquiring the to-be-detected image;
    obtaining at least one restored image corresponding to the to-be-detected image based on the to-be-detected image, at least one mask image group and a plurality of defect-free positive sample images, wherein each mask image group of the at least one mask image group comprises at least two binary images having a complementary relationship, and different mask image groups of the at least one mask image group have different image sizes; and
    locating the defect of the to-be-detected image based on the to-be-detected image and each of the at least one restored image;
    wherein obtaining the at least one restored image corresponding to the to-be-detected image based on the to-be-detected image, the at least one mask image group and the plurality of defect-free positive sample images comprises:
    acquiring a currently processed target mask image group and combining the to-be-detected image with a plurality of binary images in the target mask image group separately to obtain a plurality of restoration data pairs;
    inputting the plurality of restoration data pairs to a pre-trained image completion model to form a plurality of restored pictures corresponding to the target mask image group, wherein the image completion model is obtained by training the plurality of positive sample images; and merging the plurality of restored pictures to obtain a restored image corresponding to the target mask image group.

2. The method of claim 1, wherein merging the plurality of restored pictures to obtain the restored image corresponding to the target mask image group comprises:

multiplying each restored picture of the plurality of restored pictures by a binary image comprised in the target mask image group and corresponding to the each restored picture to obtain a plurality of reference images; and adding up the plurality of reference images to obtain the restored image corresponding to the target mask image group.

3. The method of claim 1, before inputting the plurality of restoration data pairs to the pretrained image completion model, the method further comprising:

randomly generating a plurality of binary images; and unsupervisedly training a set machine learning model based on the plurality of positive sample images and the plurality of binary images to generate the image completion model.

4. The method of claim 3, wherein unsupervisedly training the set machine learning model based on the plurality of positive sample images and the plurality of binary images to generate the image completion model comprises:

selecting one positive sample image of the plurality of positive sample images and one binary image of the plurality of binary images and multiplying each pixel of the one positive sample image by a corresponding pixel of the one binary image to obtain one defective image;

merging the one defective image with the selected one binary image to obtain one four-channel target image;

inputting the one target image to the machine learning model to train the machine learning model; and repeatedly performing the step of selecting one positive sample image of the plurality of positive sample images and one binary image of the plurality of binary images to the step of inputting the one target image to the machine learning model to train the machine learning model until a training termination condition is satisfied, so as to obtain the image completion model.

5. The method of claim 1, wherein the at least one restored image comprises a plurality of restored images, and wherein locating the defect of the to-be-detected image based on the to-be-detected image and the each restored image comprises:

comparing the to-be-detected image with the plurality of restored images separately to obtain a plurality of difference thermodynamic diagrams;

using a maximum value of each thermodynamic point in the plurality of difference thermodynamic diagrams to construct a target thermodynamic diagram; and performing binary segmentation of the target thermodynamic diagram to obtain a defect area in the to-be-detected image.

6. The method of claim 5, wherein comparing the to-be-detected image with the plurality of restored images separately to obtain the plurality of difference thermodynamic diagrams comprises:

determining a gradient magnitude similarity deviation between the to-be-detected image and the plurality of restored images separately and obtaining the plurality of difference thermodynamic diagrams based on a determination result of the similarity deviation.

7. An electronic device, comprising:

at least one processor; and a memory communicatively connected to the at least one processor, wherein the memory stores instructions executable by the at least one processor to enable the at least one processor to perform the following steps:

acquiring a to-be-detected image;

obtaining at least one restored image corresponding to the to-be-detected image based on the to-be-detected image, at least one mask image group and a plurality of defect-free positive sample images, wherein each mask image group of the at least one mask image group comprises at least two binary images having a complementary relationship, and different mask image groups of the at least one mask image group have different image sizes; and locating a defect of the to-be-detected image based on the to-be-detected image and each of the at least one restored image;

wherein the instructions are configured to enable the at least one processor to perform the obtaining the at least one restored image corresponding to the to-be-detected image based on the to-be-detected image, the at least one mask image group and the plurality of defect-free positive sample images by:

acquiring a currently processed target mask image group and combining the to-be-detected image with a plurality of binary images in the target mask image group separately to obtain a plurality of restoration data pairs;

inputting the plurality of restoration data pairs to a pretrained image completion model to form a plurality of restored pictures corresponding to the target mask image group, wherein the image completion model is obtained by training the plurality of positive sample images; and merging the plurality of restored pictures to obtain a restored image corresponding to the target mask image group.

8. The electronic device of claim 7, wherein the instructions are configured to enable the at least one processor to perform the merging the plurality of restored pictures to obtain the restored image corresponding to the target mask image group by:

multiplying each restored picture of the plurality of restored pictures by a binary image comprised in the target mask image group and corresponding to the each restored picture to obtain a plurality of reference images; and adding up the plurality of reference images to obtain the restored image corresponding to the target mask image group.

9. The electronic device of claim 7, wherein the instructions are configured to enable the at least one processor to further perform, before inputting the plurality of restoration data pairs to the pretrained image completion model, the following steps:

randomly generating a plurality of binary images; and unsupervisedly training a set machine learning model based on the plurality of positive sample images and the plurality of binary images to generate the image completion model.

10. The electronic device of claim 9, wherein the instructions are configured to enable the at least one processor to perform the unsupervisedly training the set machine learning model based on the plurality of positive sample images and the plurality of binary images to generate the image completion model by:
  selecting one positive sample image of the plurality of positive sample images and one binary image of the plurality of binary images and multiplying each pixel of the one positive sample image by a corresponding pixel of the one binary image to obtain one defective image;
  merging the one defective image with the selected one binary image to obtain one four-channel target image;
  inputting the one target image to the machine learning model to train the machine learning model; and
  repeatedly performing the step of selecting one positive sample image of the plurality of positive sample images and one binary image of the plurality of binary images to the step of inputting the one target image to the machine learning model to train the machine learning model until a training termination condition is satisfied, so as to obtain the image completion model.

11. The electronic device of claim 7, wherein the at least one restored image comprises a plurality of restored images, and wherein the instructions are configured to enable the at least one processor to perform the locating the defect of the to-be-detected image based on the to-be-detected image and the each restored image by:
  comparing the to-be-detected image with the plurality of restored images separately to obtain a plurality of difference thermodynamic diagrams;
  using a maximum value of each thermodynamic point in the plurality of difference thermodynamic diagrams to construct a target thermodynamic diagram; and
  performing binary segmentation of the target thermodynamic diagram to obtain a defect area in the to-be-detected image.

12. The electronic device of claim 11, wherein the instructions are configured to enable the at least one processor to perform comparing the to-be-detected image with the plurality of restored images separately to obtain the plurality of difference thermodynamic diagrams by:
  determining a gradient magnitude similarity deviation between the to-be-detected image and the plurality of restored images separately and obtaining the plurality of difference thermodynamic diagrams based on a determination result of the similarity deviation.

13. A non-transitory computer-readable storage medium storing computer instructions for causing a computer to perform the following steps:
  acquiring a to-be-detected image;
  obtaining at least one restored image corresponding to the to-be-detected image based on the to-be-detected image, at least one mask image group and a plurality of defect-free positive sample images, wherein each mask image group of the at least one mask image group comprises at least two binary images having a complementary relationship, and different mask image groups of the at least one mask image group have different image sizes; and
  locating a defect of the to-be-detected image based on the to-be-detected image and each of the at least one restored image;
  wherein the computer instructions are configured to cause a computer to perform the obtaining the at least one restored image corresponding to the to-be-detected image based on the to-be-detected image, the at least one mask image group and the plurality of defect-free positive sample images by:
    acquiring a currently processed target mask image group and combining the to-be-detected image with a plurality of binary images in the target mask image group separately to obtain a plurality of restoration data pairs;
    inputting the plurality of restoration data pairs to a pretrained image completion model to form a plurality of restored pictures corresponding to the target mask image group, wherein the image completion model is obtained by training the plurality of positive sample images; and
    merging the plurality of restored pictures to obtain a restored image corresponding to the target mask image group.

14. The storage medium of claim 13, wherein the computer instructions are configured to cause a computer to perform the merging the plurality of restored pictures to obtain the restored image corresponding to the target mask image group by:
  multiplying each restored picture of the plurality of restored pictures by a binary image comprised in the target mask image group and corresponding to the each restored picture to obtain a plurality of reference images; and
  adding up the plurality of reference images to obtain the restored image corresponding to the target mask image group.

15. The storage medium of claim 13, wherein the computer instructions are configured to cause a computer to further perform, before inputting the plurality of restoration data pairs to the pretrained image completion model, the following steps:
  randomly generating a plurality of binary images; and
  unsupervisedly training a set machine learning model based on the plurality of positive sample images and the plurality of binary images to generate the image completion model.

16. The storage medium of claim 15, wherein the computer instructions are configured to cause a computer to perform the unsupervisedly training the set machine learning model based on the plurality of positive sample images and the plurality of binary images to generate the image completion model by:
  selecting one positive sample image of the plurality of positive sample images and one binary image of the plurality of binary images and multiplying each pixel of the one positive sample image by a corresponding pixel of the one binary image to obtain one defective image;
  merging the one defective image with the selected one binary image to obtain one four-channel target image;
  inputting the one target image to the machine learning model to train the machine learning model; and
  repeatedly performing the step of selecting one positive sample image of the plurality of positive sample images and one binary image of the plurality of binary images to the step of inputting the one target image to the machine learning model to train the machine learning model until a training termination condition is satisfied, so as to obtain the image completion model.

17. The storage medium of claim 13, wherein the at least one restored image comprises a plurality of restored images, and wherein the computer instructions are configured to cause a computer to perform the locating the defect of the to-be-detected image based on the to-be-detected image and the each restored image by:
  comparing the to-be-detected image with the plurality of restored images separately to obtain a plurality of difference thermodynamic diagrams;

using a maximum value of each thermodynamic point in the plurality of difference thermodynamic diagrams to construct a target thermodynamic diagram; and performing binary segmentation of the target thermodynamic diagram to obtain a defect area in the to-be-detected image.

\* \* \* \* \*